United States Patent [19]

Suzuki

[11] Patent Number: 4,645,686
[45] Date of Patent: Feb. 24, 1987

[54] METHOD FOR SMOOTHING MAGNETIC RECORDING MEDIA

[75] Inventor: Hideo Suzuki, Higashi-kurume, Japan

[73] Assignee: Bellmatic, Ltd., Tokyo, Japan

[21] Appl. No.: 790,173

[22] Filed: Oct. 22, 1985

[51] Int. Cl.$^4$ ............................................. B05D 3/14
[52] U.S. Cl. ..................................... 427/48; 427/128
[58] Field of Search .................................. 427/48, 128

[56] References Cited

U.S. PATENT DOCUMENTS 4,336,278  6/1982  Pertzsch ................................ 427/48
4,567,057  1/1986  Masuyama et al. .................... 427/48

FOREIGN PATENT DOCUMENTS 1416200  12/1975  United Kingdom ................. 427/48

Primary Examiner—Bernard D. Pianalto
Attorney, Agent, or Firm—Cushman, Darby & Cushmasn

[57] ABSTRACT

A smoothing method for a magnetic recording media eliminates a gravure pattern therein and a device therefor includes a belt like conveyer running together with a nonmagnetic sheet or tape at the same speed applied above a smoothing device. Many magnets are disposed underneath the conveyer to affect the magnetic field of the magnetic head applied to the magnetic recording solution to orient easily the magnetization axes of the magnetic particles of the magnetic recording solution. The magnets are positioned in various arrangement to increase the effect of the smoothing method. Also, a nonwoven fabric is used in place of the belt like conveyor to decrease friction and remove dust out of the magnetic recording media. Thus, the quality of the final products is much more highly improved than that of conventional products.

6 Claims, 14 Drawing Figures

METHOD FOR SMOOTHING MAGNETIC RECORDING MEDIA

CROSS-REFERENCE TO RELATED APPLICATION

This application is related to copending U.S. patent application Ser. No. 790,174, also filed on Oct. 22, 1985, by the same inventor and commonly assigned.

BACKGROUND OF THE INVENTION

1. Field of the Invention

The present invention relates to a method for smoothing magnetic recording media and device therefor, more particularly to a method for obtaining magnetic recording media of high density and high quality of magnetic particles without any damage thereto by removing a gravure pattern in a coating on the media.

In general, magnetic recording media including magnetic tape such as video tape or the like are coated with magnetic recording solution by means of a coating device and smoothed by a smoothing device in order to make uniform the thickness of the layer of the solution and to orient easily the magnetization axes of magnetic particles contained in said solution in a specific direction and then to treat said smoothed layer of magnetic recording solution by a dryer. That is, the coated magnetic recording solution on a nonmagnetic base is not even in thickness and a smoothing treatment is required. Conventional smoothing treatments such as blade smoothing, doctor smoothing, film smoothing or the like are well known. In these smoothing methods, a layer of coated solution is smoothed by a blade, a doctor or a sheet of film. However, it has been pointed out as drawbacks that several longitudinal lines or bubbles are observed in the direction of movement of the nonmagnetic sheet, otherwise patterns of various stripes are observed depending upon the quality of the solution, if a surplus of said solution is not scraped skillfully. In addition, guide rolls disposed underneath said nonmagnetic base facing a blade or a doctor knife located above the base sometimes cause uneven thickness of the layer of the solution due to imperfectness of the finished dimension of said rolls. In order to eliminate such problems, there has been proposed a method that many magnets are disposed with their magnetic poles alternately arranged. A nonmagnetic base coated with magnetic recording solution on the surface of said nonmagnetic base is slidably placed on the magnets and a layer of the coated solution is smoothed by magnetic fields of said magnets. However, in this case a nonmagnetic base is touched on the surface of the magnets and the nonmagnetic base is inclined to being damaged, particularly when dust causes damages by friction. It is, therefore, desired to eliminate such defects.

SUMMARY OF THE INVENTION

The present invention is made taking the aforesaid drawbacks in mind and the coated solution is uniformly smoothed without damaging said nonmagnetic base. A method to smooth easily the magnetization axes of the magnetic particles contained in the magnetic recording solution and a device therefor are disclosed by this invention.

In the present invention a nonmagnetic sheet coated with magnetic recording solution comprising magnetic materials and nonmagnetic pigments is delivered from feed rolls. Said coated solution is smoothed and dried in the dryer. In such smoothing method of magnetic recording media, the nonmagnetic sheet coated with magnetic recording solution is moved onto a belt like conveyer which is running together with said nonmagnetic sheet at the same speed. The magnetic heads placed underneath said belt like conveyer affect the basic sheet with the magnetic fields in sequence from head to head to smooth said sheet.

It is another object of the present invention to emphasize the effect of smoothing by disposing many magnets whose magnetic poles are alternately arranged underneath said belt like conveyer.

It is another object of the present invention to apply a nonwoven fabric belt in place of the belt like conveyer to prevent said nonmagnetic sheet from being contaminated or damaged by dust.

DETAILED DESCRIPTION OF THE PREFERRED EMBODIMENT

Figure 1:
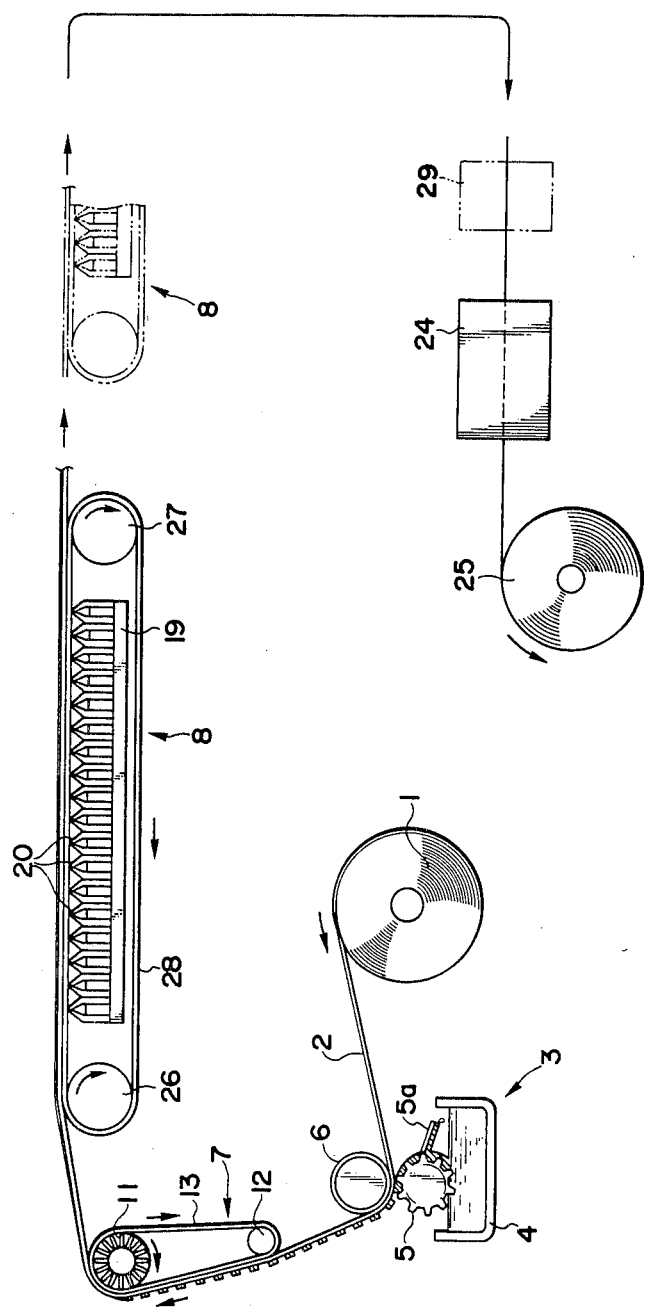
FIG. 1 is a flow sheet of the production of magnetic recording media of the present invention.
Figure 2:
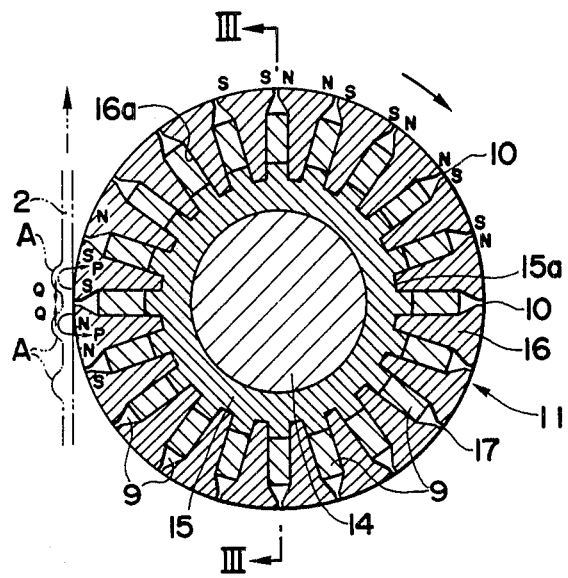
FIG. 2 is a cross-section of the smooth roll of the smoothing device of the present invention.
Figure 3:
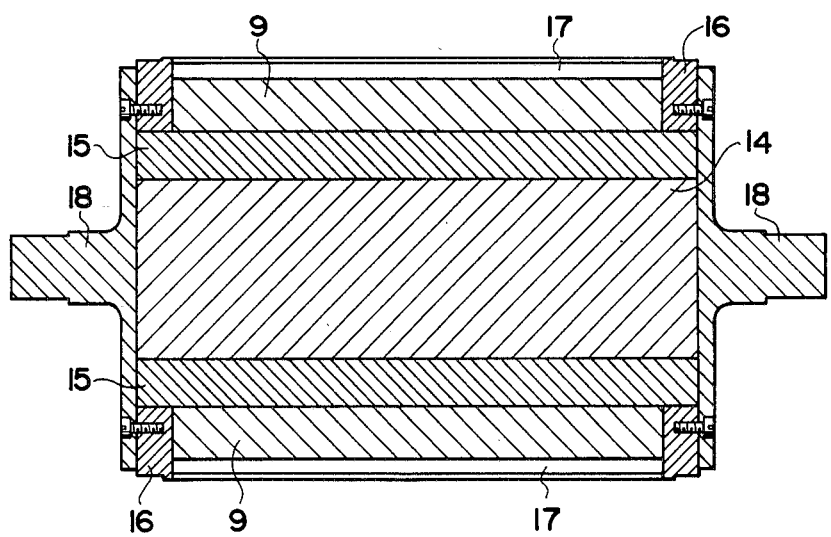
FIG. 3 is a side sectional view taken along the line I—I in FIG. 2.
Figure 4:
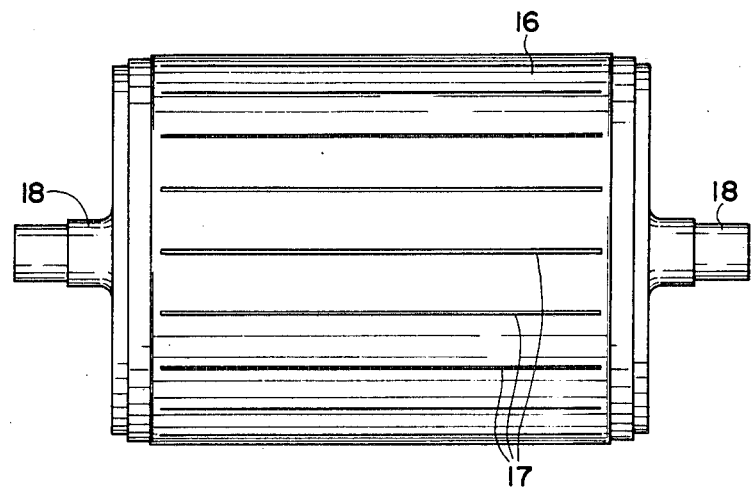
FIG. 4 is a front view of the smooth roll.
Figure 5:
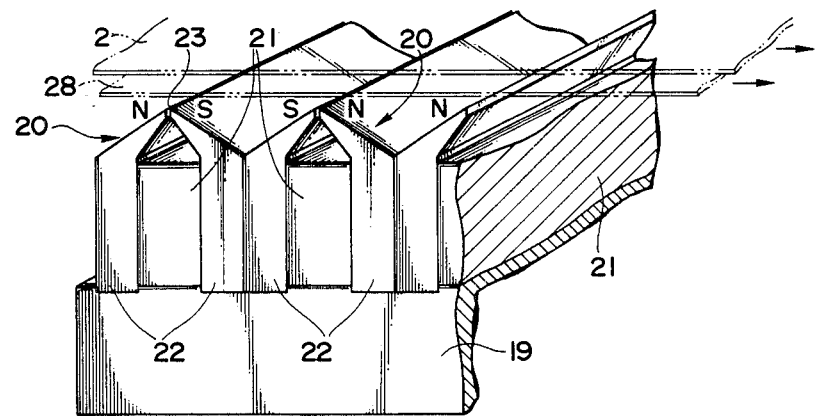
FIG. 5 is a perspective view of the second smoothing device.
Figure 6:
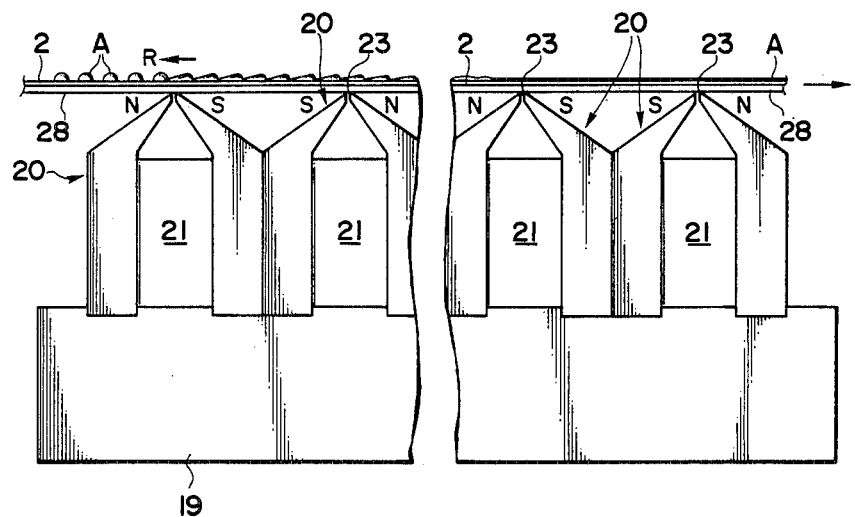
FIG. 6 is a front view of the second smoothing device.

A preferred embodiment of the smoothing method in the manufacture of the magnetic recording media of the present invention is explained in the drawings. In FIG. 1, a feed roll 1 has wound therearound a nonmagnetic sheet 2 made of polyester or the like. The nonmagnetic sheet 2 delivered from the feed roll 1 is introduced to a coating device 3 and the magnetic recording solution on said nonmagnetic sheet 2 is coated. Said magnetic recording solution comprises magnetic particles and nonmagnetic pigments. The coating device 3 applies a type of gravure coating and comprises a pan 4 in which the magnetic recording solution is stored, a cup roll 5 whose surface is inscribed with cells to coat said magnetic recording solution on the nonmagnetic sheet 2, a blade 5a which removes a surplus solution out of said cup roll 5, and a back roll 6 to press toward said cup roll 5 the nonmagnetic sheet 2. Said nonmagnetic sheet 2 coated with the magnetic recording solution by the coating device 3 is delivered to the first smoothing device 7 and next to the second smoothing device 8. A plural number of the second smoothing device 8 is used if necessary. As shown in FIG. 2, the first smoothing device has a smooth roll 11 fitted with many magnetic heads 10 around the surface at regular intervals. As shown in FIG. 1, there is disposed a belt like conveyer 13 made of rubber, teflon or thin stainless steel sheet around said smooth roll 11 and a subordinate roll 12. The smooth roll 11 rotates in the same direction as that of the nonmagnetic sheet 2 at same running speed. Accordingly, the belt like conveyer 13 rotates in the same direction as that of the nonmagnetic sheet 2 at the same speed. As shown in FIG. 2 and FIG. 3, a first shaft 15 is set to a center shaft 14 and has a circumference with shallow slots 15a. A second shaft 16 is set to the first shaft 15. Around the inside surface of the second shaft 16, deep slots 16a are disposed. The slots 15a and the slots 16a gear each other. Many magnets are disposed on the slots 16a of the second shaft 16. The slots 16a are opened through gaps 17 on the outside surface of the second shaft 16. In this consequence many magnetic heads 10 surrounding the gaps 17 are formed in the circumference of the smooth roll 11. End shafts 18 shown in FIG. 3 are screwed at both ends of said smooth roll 11. As one of the embodiments, alternately arranged polarities of the gaps 17 are shown in FIG. 2. It is also possible to arrange the polarities in the same direction. As shown in FIG. 5 and FIG. 6, many magnetic heads 20 are alternately arranged on a fitting base 19 of the second smoothing device shown in FIG. 1. As shown in FIG. 5, each magnetic head 20 clamps a magnet 21 by magnet plates 22 and there is a gap 23 between the top ends of said magnet plates 22. In FIGS. 5 and 6, polarities of gaps 23 are contiguous to each other in alternate arrangement. Otherwise, all the polarities of the gaps 23 are contiguous to each other in the same direction. As shown in FIG. 1, both ends of the second smoothing device 8 are disposed with the rolls 26 and 27 around which the belt like conveyer 28 made of rubber, teflon or thin stainless steel sheet is running. The belt like conveyer 28 runs together with the nonmagnetic sheet 2 at the same speed. The magnetic recording solution on the nonmagnetic sheet 2 passing through the second smoothing device 8 is dried by the drier 24 and taken up onto a take up roll 25.

Figure 7:
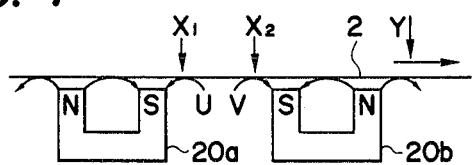
FIG. 7 shows an orientation of a magnetic sheet on the second smoothing device.
Figure 8:
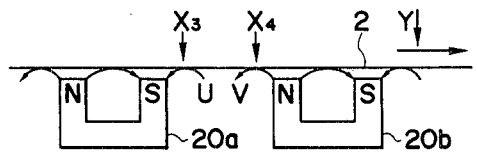
FIG. 8 shows an orientation of magnetic tape on the second smoothing device.

Next, the smoothing method is explained in the following description. The magnetic recording solution to be coated on the surface of the nonmagnetic sheet 2 by means of the cup roll 5 is coated in accordance with cells engraved around the surface of the cup roll 5 and delivered to the first smoothing device 7. In the first smoothing device 7, uneven thickness of the layer of the magnetic recording solution is smoothed by magnetic force of the magnetic head 10 (FIG. 2) of the smooth roll 11 through the belt 13. As shown in FIG. 2, a line of magnetic force P goes in the direction shown by the arrow and the magnetic particles contained in the magnetic recording solution are absorbed and controlled by said line of magnetic force P and consequently the magnetic recording solution is smoothed. In the second smoothing device shown in FIG. 6, when the nonmagnetic sheet 2 runs together with the belt like conveyer 28 above the magnetic head 20, the magnetic particles are affected and controlled by the magnetic field of the magnetic head 20 in the direction of absorption by the magnetic field and the magnetic recording solution is elongated in the direction of an arrow R whenever said nonmagnetic sheet 2 passes over the magnetic head 20 and uneven thickness of said magnetic recording solution is smoothed. The smoothing of the solution and the orientation of the magnetization axes of the magnetic particles is easily performed by the magnetic heads 10 and 20 in the first smoothing device 7 and the second smoothing device 8, particularly strongly in the second smoothing device 8. In FIG. 7, a line of magnetic force of the first magnetic head 20a turns in a U direction at the point $X_1$ and it turns in a V direction at the point $X_2$ in the second magnetic head 20b. However, the magnetization axes of the magnetic particles are easily oriented in the specific direction by the magnetic field of the magnetic head 20b at the final stage. If the space of gap 23 of each magnetic head 20 and the power of the magnetic force of the magnet 21 (FIG. 6) are previously controlled, the most optimum orientation is obtained. In FIG. 8, the polarities of each magnetic head 20 are arranged in the same direction. The magnetic force is created in the U direction at point $X_3$ by the first magnetic head 20a and the next magnetic force is created in the V direction at point $X_4$ by the second magnetic head 20b. However, all the magnetization axes of the magnetic particles contained in the magnetic recording solution are easily oriented in the specific direction by the magnetic force of the final magnetic force line Y. The nonmagnetic sheet 2 passing through the second smoothing device 8 (FIG. 1) is delivered into the dryer 24 to be dried and manufacture of the magnetic recording media is completed. Said nonmagnetic sheet 2 is taken up onto the take up roll 25. They are cut at a desired dimension for final use. It is also recommended to place an orientation device 29 between the second smoothing device 8 and the dryer 24 for more precise smoothing.

Though the first smoothing device 7 and the second smoothing device 8 are jointly used in the embodiment, they may be of course used independently. In the first smoothing device 7, the belt like conveyer 13 is sometimes eliminated and the belt like conveyer 28 is also sometimes eliminated out of the second smoothing device 8.

Figure 9:
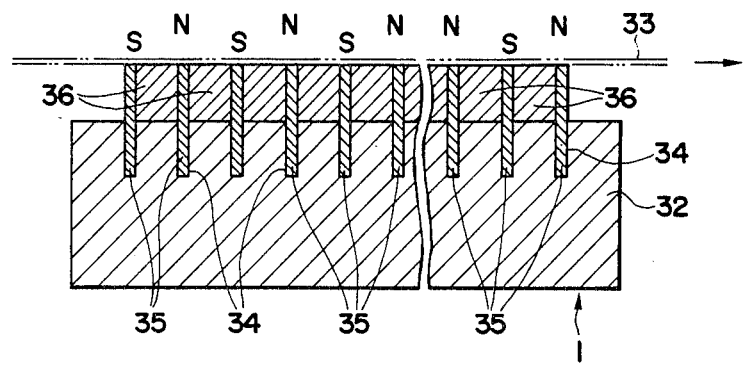
FIG. 9 shows another embodiment of the smoothing device of the present invention.
Figure 10:
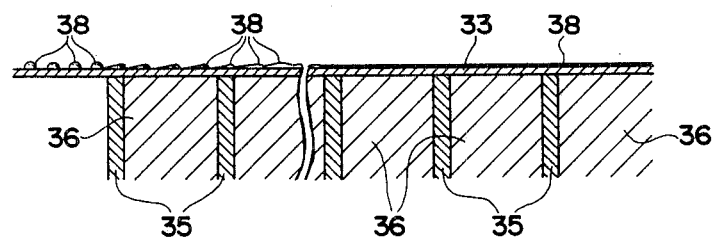
FIG. 10 is an instruction drawing of the smoothing treatment by the smoothing device of FIG. 9.

As shown in FIG. 9, a plurality of grooves 34 is carved on a base plate 32 made either of nonmagnetic material such as aluminum or of ferromagnetic material such as iron, at proper intervals in the running direction of the nonmagnetic sheet 33. A ferromagnetic plate 35 is disposed in each of said grooves 34. The ferromagnetic plate 35 is mounted at a predetermined height of projection above the surface of the base plate 32 and the width of said ferromagnetic plate 35 is structured longer than that of said nonmagnetic sheet 33. There are provided magnets 36 between each of the contiguous ferromagnetic plates 35. In this case, previously magnetized magnets 36 are provided between each of the ferromagnetic plates 35. It is also possible to provide previously magnetized multipolar magnets of ferrite 37. These magnets 36 are arranged in such a way that the two adjoining polarities are the same polarity. Accordingly, the ferromagnetic plates 35 become south S pole and north N pole alternately. The surface of each ferromagnetic plate 35 and the magnet 36 is provided with slippery treatment so that said nonmagnetic sheet 33 can slip without damage. As shown in FIG. 10, a magnetic recording solution 38 is coated in a non-uniform condition according to the gravure printing patterns of the coating device but its layer is gradually made uniform by the magnetic force of the magnets 36 of the smoothing device. In this case, as the poles of the magnets 36 are alternately arranged as from north N to south S, the magnetic particles are affected by the above magnetic polarities when passing through above said ferromagnetic plates 35. Thus, the magnetic recording solution 38 is stirred due to turn over action of the magnetic particles and deaerated gradually. At the same time, as shown by arrows in FIG. 11, the magnetic particles 39 of the magnetic recording solution 38 receive the magnetic force of the magnet 36 and are absorbed in the nonmagnetic sheet 33 and solvent 40 in the magnetic recording solution 38 is floated on the magnetic particles 39. The solvent 40 is dried and evaporates in the dryer. After the drying process has been completed, a layer of the magnetic recording solution 38 of high density is produced by the magnetic force of the magnet 36 (FIGS. 9 and 10) as well as deaeration.

Figure 12:
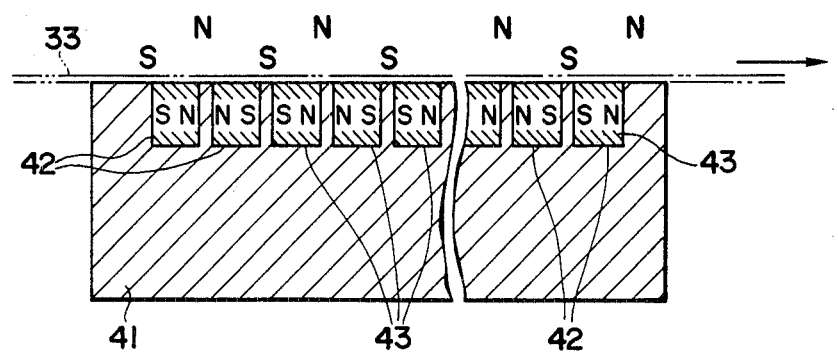
FIG. 12 is a sectional view of the smoothing device of the multiplied magnets of another embodiment.
Figure 13:
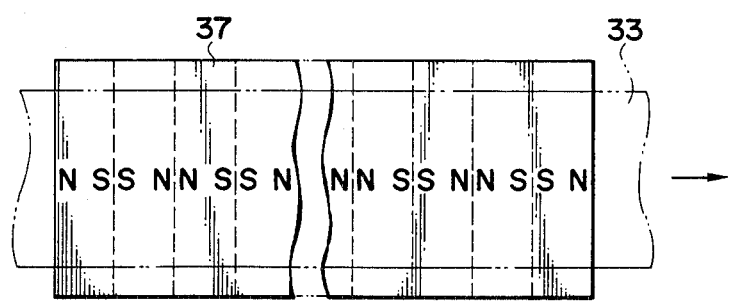
FIG. 13 is an instruction drawing of the multipolar magnetized ferrite of another embodiment.

FIG. 12 shows another embodiment of the present invention in which a ferromagnetic plate such as iron or a nonmagnetic plate such as aluminum is used as a base plate 41. Many grooves 42 are disposed at proper intervals in the running direction of a nonmagnetic sheet 33 on the surface of said base plate 41. S and N poles of the magnets 43 are alternately arranged in the grooves 42. Also, the upper surfaces of the base plate 41 and the magnet 43 are finished in slippery condition and the nonmagnetic sheet 33 runs on them without damage. In this smoothing device, the magnetic force of each magnet 43 affects the magnetic recording solution on the nonmagnetic sheet 33 to make uniform the thickness of the layer of said magnetic recording solution and said high density coating.

Figure 11:
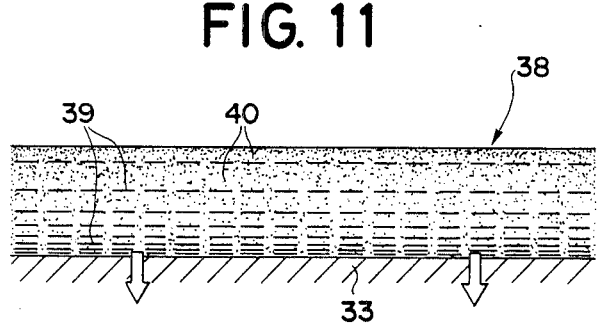
FIG. 11 shows a process of absorption of the magnetic particles in the magnetic recording solution being absorbed in the nonmagnetic base by the effect of magnetic force.

Also in the coating device which does not need smoothing treatment so much, one smoothing device is disposed in the latter stage as shown in FIG. 11 to obtain a high density layer of the magnetic particles 39. Moreover, after smoothing treatment has been done, as magnetic powders turn to a specific direction, the smoothing device is possible to be applied as a preliminary orientation device.

Figure 14:
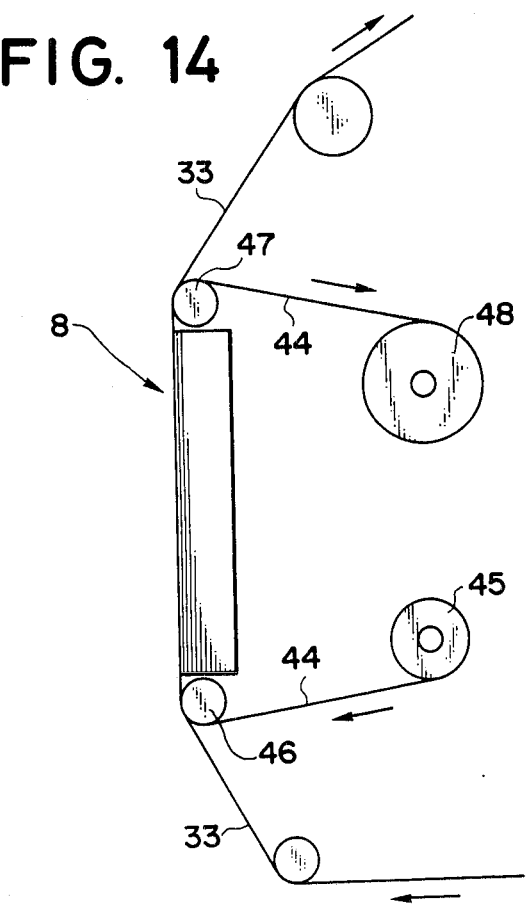
FIG. 14 is an instruction drawing showing a nonwoven fabric disposed and running in the smoothing device in place of the belt like conveyor.

Next, as shown in FIG. 14, a nonwoven fabric 44 is applied in place of the belt like conveyer above the magnets. The nonwoven fabric 44 is disposed to slightly attach the nonmagnetic sheet 33 coated with magnetic recording solution. Said nonwoven fabric 44 is like a tape and it is delivered from the feed roll 45 to take up roll 48 through guide rolls 46 and 47 and taken up onto a take up roll 48.

In FIG. 14 when smoothing treatment is being done, the nonwoven fabric 44 is delivered from the feed roll 45 at relatively low speed to the take up roll 48 and taken up onto the take up roll 48. By this treatment the nonmagnetic sheet 33 is prevented from being contaminated or damaged without touching the plate or magnet. Further, as the nonwoven fabric 44 runs at lower speed than that of the nonmagnetic sheet 33, said nonmagnetic sheet 33 is not damaged by dust or contamination on the nonwoven fabric 44.

As aforementioned, in the smoothing device of any other embodiment of the present invention, it is possible to prevent said nonmagnetic sheet 33 from being damaged by friction if a nonwoven fabric 44 is placed above the magnets. It is also possible to remove dust or contamination out of the nonmagnetic sheet 33 and excellent quality of a magnetic recording media is obtained.

What is claimed is:

1. A method for obtaining a magnetic recording media comprising the steps of:
   delivering a nonmagnetic sheet having an upper surface from a feed roller to a coating device;
   applying a magnetic recording solution having magnetic particles therein to the upper surface of the nonmagnetic sheet in a non-uniform condition impressed according to a gravure printing pattern on a roller of the coating device;
   transferring the nonmagnetic sheet coated with the magnetic recording solution to a first means for magnetically smoothing gradually the magnetic recording solution on the upper surface of the nonmagnetic sheet, said first means rotating together with the nonmagnetic sheet coated with the magnetic recording solution so that the magnetic particles contained in the magnetic recording solution are partially smoothed out;
   transferring the nonmagnetic sheet coated with the magnetic recording solution to at least a second means for magnetically smoothing gradually the magnetic recording solution on the upper surface of the nonmagnetic sheet, said second means applying magnetic force in spaced intervals to the magnetic recording solution so that the magnetic particles contained in the magnetic recording solution are finally smoothed out;
   drying the smoothed magnetic recording solution coated on the upper surface of the nonmagnetic sheet;
   whereby a magnetic recording media of high quality is obtained by the smoothing of the recording solution into a uniform condition such that the gravure printing pattern impressed thereon is removed therefrom.

2. In the method according to claim 1, wherein:
   south S and north N poles of magnets of magnetic heads fitted on magnetic plates are disposed in alternate arrangement in the smoothing means, the magnetic recording solution on the upper surface of the nonmagnetic sheet being affected by magnetic force of said magnets.

3. In the method according to claim 1, wherein:
   magnets are successively disposed at spaced intervals from each other between ferromagnetic plates on magnetic plates in the smoothing means.

4. In the method according to claim 1, wherein:
   magnets are disposed in grooves on magnetic plates at intervals spaced from each other in the smoothing means.

5. In the method according to claim 1, wherein:
   magnetized ferrite multipolar magnets are applied as magnets in the smoothing means.

6. In the method according to claim 1, further comprising the step of:
   applying a nonwoven fabric above magnets arranged with many poles in the smoothing means, said nonwoven fabric being attached to the nonmagnetic sheet coated with the magnetic recording solution.

* * * * *